US012786017B2

(12) United States Patent
Nagel

(10) Patent No.: US 12,786,017 B2
(45) Date of Patent: Nov. 3, 2026

(54) METHOD OF SUPPRESSING UNWANTED SIGNAL PORTIONS IN AN IQ SIGNAL

(71) Applicant: Rohde & Schwarz GmbH & Co. KG, Munich (DE)

(72) Inventor: Joerg Nagel, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 19 days.

(21) Appl. No.: 18/978,386

(22) Filed: Dec. 12, 2024

(65) Prior Publication Data

US 2025/0233778 A1 Jul. 17, 2025

(30) Foreign Application Priority Data

Jan. 16, 2024 (EP) .................................... 24152216

(51) Int. Cl.
*H04L 25/03* (2006.01)
*H04L 25/49* (2006.01)
*H04L 27/36* (2006.01)
*H04L 27/38* (2006.01)

(52) U.S. Cl.
CPC .... *H04L 25/03006* (2013.01); *H04L 25/4917* (2013.01); *H04L 27/364* (2013.01); *H04L 27/3863* (2013.01)

(58) Field of Classification Search
CPC ........... H04L 25/03006; H04L 25/4917; H04L 27/3863; H04L 27/364
USPC .......................................................... 375/262
See application file for complete search history.

(56) References Cited

U.S. PATENT DOCUMENTS

| | | | |
|---|---|---|---|
| 7,010,278 B2 | 3/2006 | Kirschenmann et al. | |
| 2005/0223306 A1* | 10/2005 | Franca-Neto | H04B 1/71632 714/784 |
| 2008/0063113 A1 | 3/2008 | Gao et al. | |
| 2014/0155006 A1* | 6/2014 | Matsuura | H04L 27/00 455/114.3 |

FOREIGN PATENT DOCUMENTS

| | | | |
|---|---|---|---|
| EP | 0503588 A2 | 9/1992 | |
| EP | 0503588 A3 | 9/1992 | |
| KR | 20100029667 * | 3/2010 | |
| WO | 2017109235 A1 | 6/2017 | |
| WO | WO-2021091619 A1 * | 5/2021 | H03D 7/165 |

* cited by examiner

*Primary Examiner* — Leila Malek
(74) *Attorney, Agent, or Firm* — CHRISTENSEN O'CONNOR JOHNSON KINDNESS PLLC

(57) ABSTRACT

A method of suppressing unwanted signal portions in an IQ signal generated by an IQ signal generator system includes generating, by a baseband circuit, a multi-tone baseband IQ signal, modulating, by a IQ modulator circuit, the baseband IQ signal, thereby obtaining a modulated IQ signal, determining, by an analysis circuit, a level function describing a signal level of the modulated IQ signal over time and/or over a phase of the multi-tone signal, determining, by the analysis circuit, at least one error quantity based on the level function, wherein the at least one error quantity is indicative of at least one error in the IQ signal generator system, and controlling, by a control circuit, the baseband circuit and/or the IQ modulator circuit in dependence of the at least one error quantity determined, thereby correcting the at least one error in the IQ signal generator system.

16 Claims, 4 Drawing Sheets

METHOD OF SUPPRESSING UNWANTED SIGNAL PORTIONS IN AN IQ SIGNAL

CROSS-REFERENCE TO RELATED APPLICATION

This application claims priority to European Application No. 24 152 216.8, filed on Jan. 16, 2024, the entire disclosure of which is incorporated herein in its entirety.

FIELD OF THE DISCLOSURE

Embodiments of the present disclosure generally relate to a method of suppressing unwanted signal portions in an IQ signal generated by an IQ signal generator system. Embodiments of the present disclosure further relate to an IQ signal generator system.

BACKGROUND

IQ signal generator systems usually comprise a baseband circuit generating an in-phase (I) signal part and a quadrature (Q) signal part, and a modulation module that generates a modulated IQ signal based on the I signal part and the Q signal part.

In such IQ signal generator systems, it is desirable to suppress sidebands occurring around the carrier frequency. Conventional suppression techniques rely on measurements that are performed by external measurement devices such as a spectrum analyzer. Based on the measurements, correction quantities are determined and the operational parameters of the IQ signal generator system are adapted accordingly.

However, it has turned out that common static suppression techniques do not sufficiently account for frequency-dependent effects that introduce additional errors and thus lead to an incomplete suppression of the sidebands.

Thus, there is a need for a method of suppressing unwanted signal portions in an IQ signal that improves the correction of unwanted signal portions.

SUMMARY

The following summary of the present disclosure is intended to introduce different concepts in a simplified form that are described in further detail in the detailed description provided below. This summary is neither intended to denote essential features of the present disclosure nor shall this summary be used as an aid in determining the scope of the claimed subject matter.

Embodiments of the present disclosure provide a method of suppressing unwanted signal portions in an IQ signal generated by an IQ signal generator system. The IQ signal generator system comprises, for example, a baseband circuit, an IQ modulator circuit, an analysis circuit, and a control circuit. In an embodiment, the method comprises

- generating, by the baseband circuit, a baseband IQ signal having a baseband I signal part and a baseband Q signal part, wherein the baseband IQ signal is a multi-tone signal;
- modulating, by the IQ modulator circuit, the baseband IQ signal, thereby obtaining a modulated IQ signal;
- determining, by the analysis circuit, a level function describing a signal level of the modulated IQ signal over time and/or over a phase of the multi-tone signal;
- determining, by the analysis circuit, at least one error quantity based on the level function, wherein the at least one error quantity is indicative of at least one error in the IQ signal generator system; and
- controlling, by the control circuit, the baseband circuit and/or the IQ modulator circuit in dependence of the at least one error quantity determined, thereby correcting the at least one error in the IQ signal generator system.

As set forth herein, the term "level function" is understood to denote a discrete function or a continuous function that describes a quantity associated with the signal level of the modulated IQ signal. For example, the level function may describe an amplitude of the modulated IQ signal or a power of the modulated IQ signal.

The disclosed method is based on the finding that, if the baseband IQ signal is a multi-tone signal, for example a two-tone signal, the level function described above comprises information on errors occurring in the IQ signal generator system. As will be described in more detail below, the level function comprises information on IQ gain imbalances and IQ quadrature errors if the baseband IQ signal is a multi-tone signal, for example a two-tone signal.

Accordingly, the at least one error quantity describing the at least one error can be determined based on the determined level function, and the at least one error can be corrected by the control circuit.

In an embodiment, it has turned out that the disclosed method is suitable for correcting frequency-dependent errors, for example frequency-dependent IQ gain imbalances and/or frequency-dependent IQ quadrature errors.

It should be understood that the disclosed method does not need external measurement devices in order to be performed. In an embodiment, the analysis circuit and the control circuit may be integrated into the same electronic device comprising the IQ signal generator system. Thus, the effort and costs for suppressing unwanted signal portions, for example in the sidebands, are reduced.

In an embodiment, the method may be performed partially or completely by software of the electronic device comprising the IQ signal generator system. Accordingly, the disclosed method may be a computer-implemented method.

According to an aspect of the present disclosure, the at least one error quantity, for example, is indicative of an IQ gain imbalance, and/or of an IQ quadrature error. Thus, the IQ gain imbalance, and/or the IQ quadrature error may be corrected automatically by the control circuit based on the at least one error quantity determined.

Therein and in the following, the term "IQ gain imbalance" is understood to denote a gain imbalance between a signal path processing the baseband I signal part and a signal path processing the baseband Q signal part. These signal paths may each comprise amplifiers, attenuators, filters, etc., which may influence the gain applied to the baseband I signal part and the baseband Q signal part.

Further, the term "IQ quadrature error" is understood to denote a deviation from orthogonality of an I signal portion and a Q signal portion in the modulated IQ signal. For example, this may occur if the local oscillator signal used for modulation is applied to the baseband I signal part and the baseband Q signal part with a phase difference being different from 90°, i.e. with a phase difference that is not exactly 90°.

In an embodiment, the level function is an envelope of the modulated IQ signal. In the context of the present disclosure, the term "envelope" is understood to denote a function, for example a smooth function, outlining the signal level of the modulated IQ signal. In an embodiment, the envelope of the modulated IQ signal may be equal to the instantaneous amplitude of the modulated IQ signal.

According to another aspect of the present disclosure, the analysis circuit comprises, for example, an envelope detector, wherein the level function is determined by the envelope detector. Such envelope detectors usually are provided in IQ signal generator systems anyway. Thus, no further hardware or other measurement equipment is necessary for determining the level function, thereby reducing the effort and costs for suppressing the unwanted signal portions.

In another embodiment, the individual signals of the multi-tone signal are distributed over sidebands of the modulated IQ signal. This allows to purposefully correct unwanted signal portions in the sidebands of the modulated IQ signal.

A further aspect of the present disclosure provides that the multi-tone signal comprises, for example, a first frequency and a second frequency. In an embodiment, a summed frequency being a sum of the first frequency and the second frequency is different from zero, and wherein the level function multiplied with a spectral factor is integrated over time in order to determine the at least one error quantity. It has turned out that with this choice of the first frequency and the second frequency, the level function varies over time if an error is present in the IQ signal generator system, while the level function is constant if no error is present in the IQ signal generator system. By integrating over the level function multiplied by the spectral factor, a measure for the at least one error is obtained, namely the at least one error quantity.

In general, the first frequency and the second frequency have different signs, i.e. if the first frequency is positive then the second frequency is negative and vice versa.

In an embodiment, the spectral factor depends on the summed frequency. In an embodiment, the spectral factor may be $\sin(2\pi \cdot Fd \cdot t)$ or $\cos(2\pi \cdot Fd \cdot t)$, wherein Fd the absolute value of the summed frequency and t is time.

In an embodiment, the level function multiplied with the spectral factor is integrated over a predetermined period or a multiple of the predetermined period, wherein the predetermined period is the inverse of the summed frequency, for example wherein the spectral factor is integrated over an integer multiple of the predetermined period. While integrating over one predetermined period is enough in order to determine the at least one error quantity, uncorrelated distortions in the level function can be suppressed by integrating over a multiple of the predetermined period, for example over an integer multiple of the predetermined period.

According to an aspect of the present disclosure, the at least one error quantity, for example, is determined for a set of first frequencies and second frequencies, respectively. Accordingly, the first frequency and/or the second frequency may be varied over a relevant frequency range, such that the at least one error quantity is determined for the whole relevant spectrum, namely for the whole relevant baseband spectrum. This allows for a particularly precise suppression of the unwanted signal portions over the whole relevant spectrum, for example over the sidebands of the modulated IQ signal.

For example, a frequency sweep may be applied to the first frequency and/or to the second frequency.

In another embodiment, the multi-tone signal comprises a first frequency and a second frequency, wherein a summed frequency being a sum of the first frequency and the second frequency is equal to zero, and wherein the level function is determined by varying a phase between the individual tones of the baseband IQ signal. It has turned out that with this choice of the first frequency and the second frequency, the level function varies over the relative phase of the first tone having the first frequency and the second tone having the second frequency if an error is present in the IQ signal generator system, while the level function is constant if no error is present in the IQ signal generator system. Thus, the at least one error quantity can be determined based on the variation of the level function over the relative phase.

In an embodiment, the individual tones of the baseband IQ signal may be generated by different signal generator units. In an embodiment, each signal generator unit may generate a signal having a real signal portion and an imaginary signal portion. The real signal portions may be summed, thereby obtaining the baseband I signal part. Further, the imaginary signal portions may be summed, thereby obtaining the baseband Q signal part.

Another aspect of the present disclosure provides, for example, that a gain applied to the baseband I signal part and/or a gain applied to the baseband Q signal part are/is adjusted in order to correct the at least one error. This way, an IQ gain imbalance between the baseband I signal part and the baseband Q signal part can be corrected.

In an embodiment, an adapted baseband I signal part is determined, wherein the adapted baseband I signal part is a linear combination of the baseband I signal part and the baseband Q signal part. Alternatively or additionally, an adapted baseband Q signal part is determined, wherein the adapted baseband Q signal part is a linear combination of the baseband I signal part and the baseband Q signal part. This way, an IQ quadrature error can be corrected. In other words, the IQ quadrature error is corrected by a predistortion of the baseband I signal part and/or of the baseband Q signal part.

In an embodiment, the baseband circuit may comprise a suitable filter that is configured to determine the adapted baseband I signal part and/or the adapted Q signal part.

According to another aspect of the present disclosure, a phase difference, for example, between a local oscillator signal being applied to the I signal part and the local oscillator signal being applied to the Q signal part is adapted in order to correct the at least one error. More precisely, the phase of the local oscillator signal applied to the baseband I signal part and/or to the baseband Q signal part may be adapted such that the phase difference is exactly 90°. This way, an IQ quadrature error can be corrected.

Embodiments of the present disclosure further provide an IQ signal generator system. In an embodiment, the IQ signal generator system comprises a baseband circuit, an IQ modulator circuit, an analysis circuit, and a control circuit. The IQ signal generator system is configured to perform the method described above.

In an embodiment, the IQ signal generator system is configured to perform the method according to any one of the embodiments described above.

Regarding the advantages and further properties of the IQ signal generator system, reference is made to the explanations given above with respect to the method, which also hold for the IQ signal generator system and vice versa.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
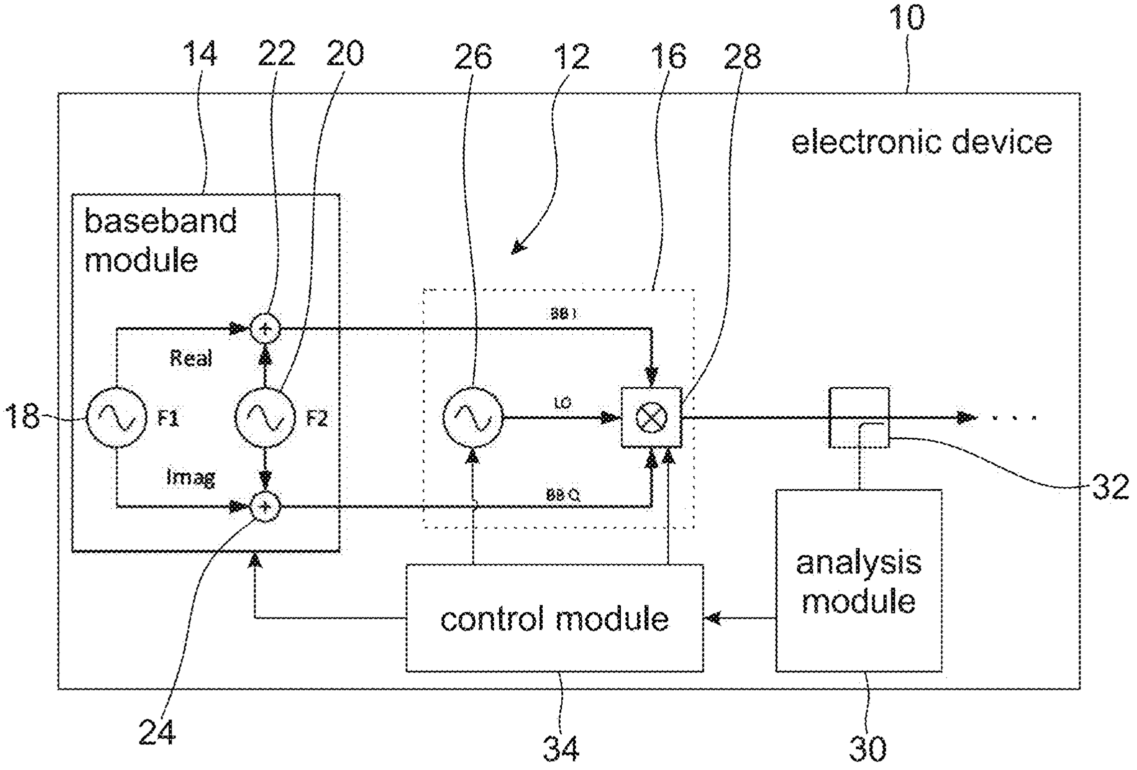
FIG. 1 schematically shows an electronic device with an IQ signal generator system according to an embodiment of the present disclosure.

FIG. 1 schematically shows an electronic device 10 comprising an IQ signal generator system 12. For example, the electronic device 10 may be a signal generator being configured to generate a test signal for testing a device under test. As another example, the electronic device 10 may be a test and/or measurement instrument for testing mobile network devices, broadcasting devices, RF transmitters, RF receivers, or other wireless communication devices. As a further example, the electronic device 10 may be an RF transmitter, a wireless communication device, for example a WLAN device, a TV transmitter, etc. However, it is to be understood that the electronic device 10 may be any other type of device with built-in IQ signal generator.

In an embodiment, the IQ signal generator system 12 comprises a baseband circuit 14 and an IQ modulator circuit 16. In general, the baseband circuit 14 is configured to generate a baseband IQ signal having a baseband I signal part ("BB I" in FIG. 1) and a baseband Q signal part ("BB Q" in FIG. 1).

In an embodiment, the baseband circuit 14 comprises a first signal generator unit 18, and a second signal generator unit 20. The first signal generator unit 18 is configured to generate a first single-tone signal having a frequency F1. The second signal generator unit 20 is configured to generate a second single-tone signal having a frequency F2.

Therein, amplitudes of the first single-tone signal and of the second single-tone signal may be equal to each other or different from each other.

In an embodiment, the baseband circuit 14 further comprises a first adder unit 22 that is configured to receive and superpose real parts of the single-tone signals generated by the signal generator units 18, 20, thereby obtaining the baseband I signal part. A second adder unit 24 is provided that is configured to receive and superpose imaginary parts of the single-tone signals generated by the signal generator units 18, 20, thereby obtaining the baseband Q signal part.

Accordingly, the baseband IQ signal is a multi-tone signal. In an embodiment, in the example embodiment shown in FIG. 1, the baseband IQ signal is a two-tone signal.

It is noted that it is also conceivable that further signal generator units may be provided in the baseband circuit 14.

In an embodiment, the IQ modulator circuit 16 comprises a local oscillator 26 that is configured to generate a local oscillator (LO) signal having a certain frequency and phase, wherein the frequency and phase of the LO signal may be tunable. The IQ modulator circuit 16 further comprises a mixer circuit 28 that is configured to receive the baseband I signal part, the baseband Q signal part, and the LO signal, and to generate a modulated IQ signal based on the LO signal and the baseband signal parts.

In an embodiment, the baseband circuit 14 and the IQ modulator circuit 16 may be configured such that a travel time of the baseband I signal part to the mixer circuit 28 is equal to a travel time of the baseband Q signal part to the mixer circuit 28.

In one or more embodiments, the modulated IQ signal may be provided to further components of the electronic device 10, as is indicated by the dots in FIG. 1. For example, the further components may comprise an RF frontend that is configured to up-convert the modulated IQ signal to an RF signal.

In an embodiment, the electronic device 10 further comprises an analysis circuit 30 that is provided downstream of the IQ modulator circuit 16. In the example embodiment shown in FIG. 1, the analysis circuit 30 is connected to the mixer circuit 28 by a directional coupler 32, such that the modulated IQ signal is forwarded to the analysis circuit 30 via the directional coupler 32. However, it is to be understood that the analysis circuit 30 may be connected to the mixer circuit 28 by any other suitable type of connection.

In an embodiment, the electronic device 10 further comprises a control circuit 34 that is connected to the analysis circuit 30 downstream of the analysis circuit 30. The control circuit 34 is further connected to the baseband circuit 14, the local oscillator 26, and/or to the mixer circuit 28. In an embodiment, the control circuit 34 may be synchronized with the baseband circuit 14 and/or with the IQ modulator circuit 16, for example with the local oscillator 26.

Figure 2:
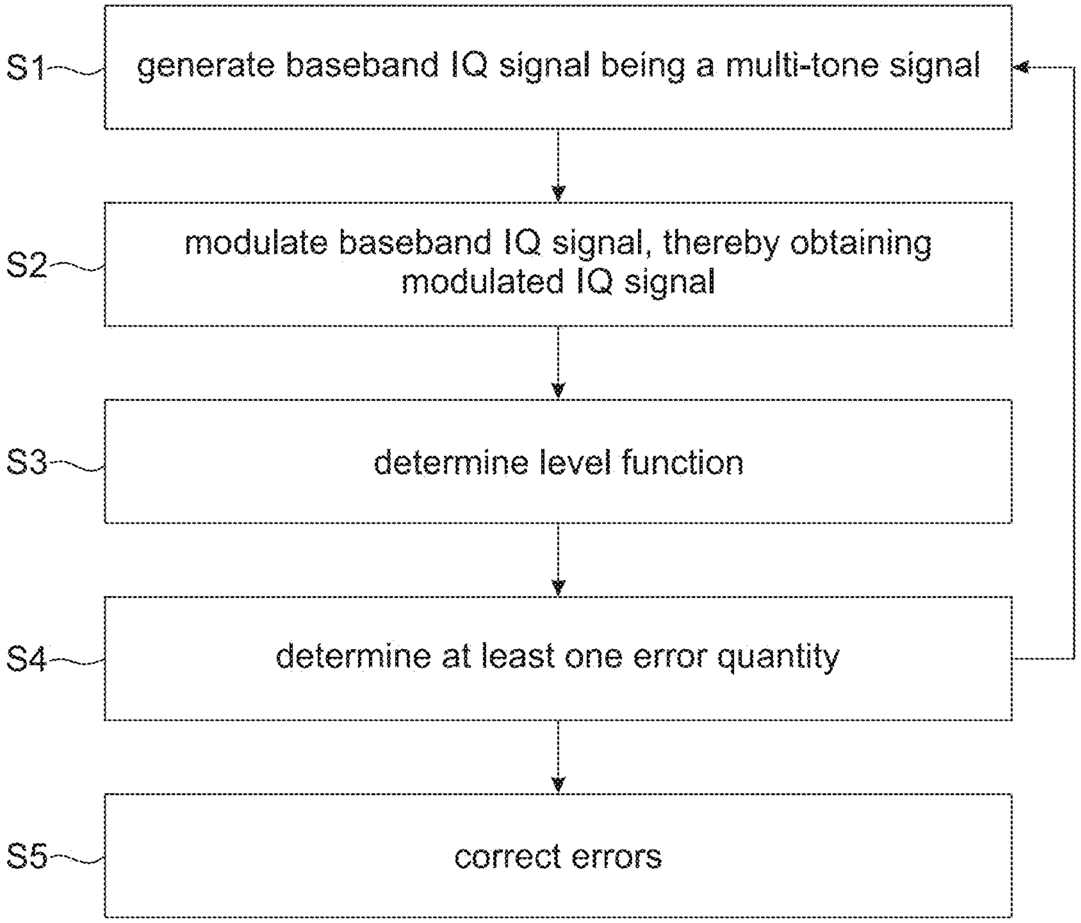
FIG. 2 shows a representative flow chart of a method of suppressing unwanted signal portions in an IQ signal according to an embodiment of the present disclosure.

In an embodiment, the electronic device 10 or the IQ signal generator system 12 is configured to perform a method of suppressing unwanted signal portions in the modulated IQ signal, an example of which is described hereinafter with reference to FIG. 2.

The baseband IQ signal being a multi-tone signal described above is generated by the baseband circuit 14 (step S1).

Without restriction of generality, the case of the baseband IQ signal being a two-tone signal is described hereinafter. Accordingly, the baseband IQ signal comprises a first tone having a frequency F1, and a second tone having a frequency F2. Therein, the frequencies F1, F2 may be chosen such that the following criteria are fulfilled.

A summed frequency Fd being equal to an absolute value of a sum of the frequencies F1 and F2 is smaller than a predetermined threshold. For example, the analysis circuit 30 may comprise an envelope detector having a certain bandwidth. In this case, the predetermined threshold may be equal to the bandwidth of the envelope detector.

The absolute values of the individual frequencies may be greater than the predetermined threshold, for example greater than the bandwidth of the envelope detector. Accordingly, one of the frequencies F1 and F2 may be positive, while the other one of the frequencies F1 and F2 may be negative. Moreover, the absolute values of the frequencies F1 and F2 are different from each other, such that the summed frequency Fd described above is different from 0.

The baseband IQ signal is modulated by the IQ modulator circuit 16, thereby obtaining the modulated IQ signal (step S2).

Choosing the frequencies F1, F2 based on the criteria described above, it is ensured that the individual signals of the two-tone signal are distributed over sidebands of the modulated IQ signal. The modulated IQ signal is forwarded to the analysis circuit 30, for example via the directional coupler 32.

A level function describing a signal level of the modulated IQ signal over time is determined by the analysis circuit 30 (step S3).

In general, the level function may be a discrete function or a continuous function describing the signal level, for example the amplitude and/or the power of the modulated IQ signal over time. In an embodiment, the level function may be an envelope of the amplitude or power of the modulated IQ signal plotted against time. In an embodiment, the analysis circuit 30 may comprise an envelope detector that is configured to determine the envelope of the modulated IQ signal.

At least one error quantity is determined based on the determined level function, wherein the at least one error quantity is indicative of at least one error in the IQ signal generator system 12 (step S4).

Figure 3:
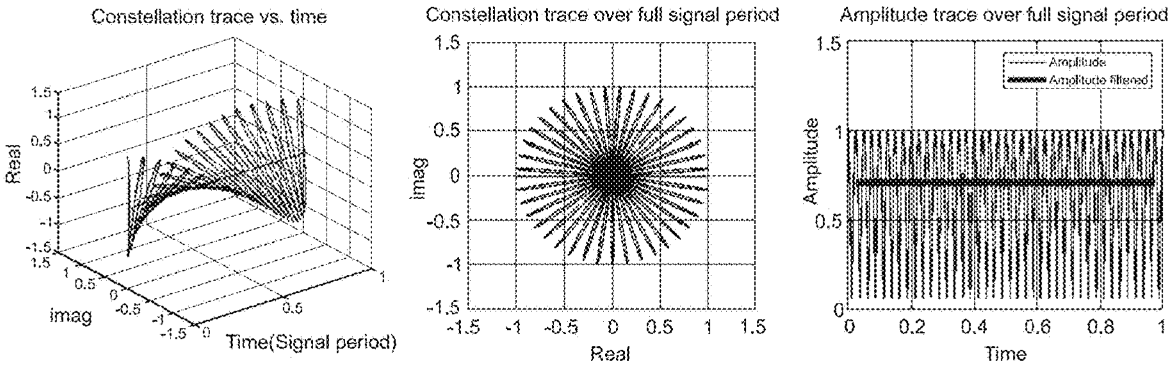
FIG. 3 shows plots of a modulated IQ signal without errors in the IQ signal generator system.
Figure 4:
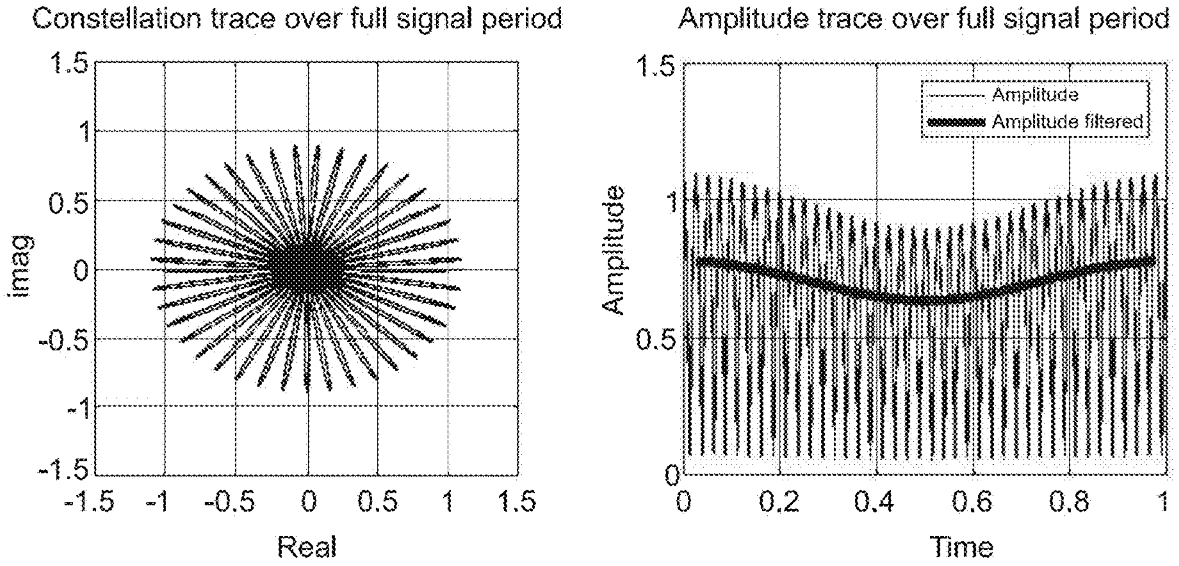
FIG. 4 shows plots of the modulated IQ signal with IQ imbalances being present.
Figure 5:
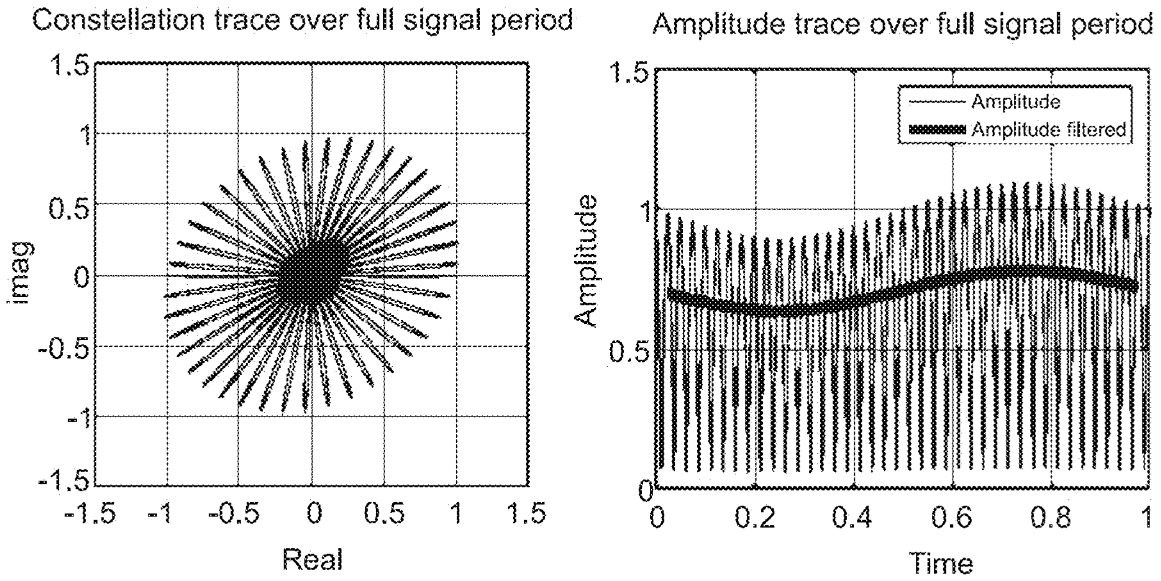
FIG. 5 shows plots of the modulated IQ signal with quadrature errors being present.

As is illustrated in FIGS. 3-5, the type and severity of the at least one error can be determined based on the determined level function. The left diagram in FIG. 3 shows a constellation trace of the modulated IQ signal corresponding to the two-tone baseband IQ signal described above over time for the case of no error being present in the IQ signal generator system 12.

The middle diagram in FIG. 3 shows the constellation trace over one full period T=1/Fd of the modulated IQ signal projected onto the I-Q-plane. As can be seen, the projected constellation trace is substantially circular if no error is present.

The right diagram in FIG. 3 shows an amplitude of modulated IQ signal plotted against time, as well as the determined level function ("Amplitude filtered" in FIG. 3) plotted against time.

As can be seen, the determined level function is constant if no errors are present.

FIG. 4 shows the projected constellation trace as well as the level function for the case of an IQ gain imbalance being present. Due to the IQ gain imbalance, the projected constellation trace deviates from the circular form and is deformed elliptically. Further, the level function is not constant but varies over time.

FIG. 5 shows the projected constellation trace as well as the level function for the case of an IQ quadrature error being present. Due to the IQ quadrature error, the projected constellation trace deviates from the circular form and is deformed elliptically. Further, the level function is not constant but varies over time.

In a linear approximation, the IQ gain imbalance and the IQ quadrature error are described by or proportional to the error quantities $E_{IQ,g}$ and $E_{IQ,quad}$, respectively, which are given by $$E_{IQ,g} = \int_0^{n\cdot T} A(t)\cos(2\pi\cdot Fd\cdot t)\,dt,$$

$$E_{IQ,quad} = \int_0^{n\cdot T} A(t)\sin(2\pi\cdot Fd\cdot t)\,dt.$$

Therein, n is a number equal to or greater than 1, A(t) is the determined level function, and T=1/Fd=1/(|F1+F2|) is the period of the modulated IQ signal.

In an embodiment, n is an integer equal to or greater than 1.

It is noted that these error quantities can be interpreted to be the real and imaginary parts of the first coefficient of a Fourier series of the level function A(t), which is periodic with period T.

The steps described above may be repeated for a set of different first frequencies F1 and second frequencies F2, i.e. the at least one error quantity may be determined for a set of different pairs (F1,F2), for example wherein the different pairs each fulfill the criteria described above.

Accordingly, the first frequency F1, the second frequency F2 and/or the summed frequency Fd=|F1+F2| may be varied, for example by applying a frequency sweep to the first frequency and/or to the second frequency.

In each iteration, the at least one error quantity is determined for baseband frequencies near F1, F2. Accordingly, by varying the first frequency F1, the second frequency F2 and/or the summed frequency Fd, the at least one error quantity can be determined for the whole relevant baseband frequency spectrum, and the corresponding errors can be corrected as described hereinafter.

The at least one determined error quantity or the determined error quantities is/are forwarded to the control circuit 34.

The baseband circuit 14 and/or the IQ modulator circuit 16 are controlled by the control circuit 34 in dependence of the at least one error quantity determined, such that the at least one error corresponding to the at least one error quantity is corrected (step S5).

For example, if the at least one error comprises an IQ gain imbalance, a gain applied to the baseband I signal part and/or a gain applied to the baseband Q signal part may be adjusted in order to correct at least one error. In an embodiment, at least one attenuator, at least one amplifier, and/or at least one filter comprised in the baseband circuit 14 and/or in the IQ modulator circuit 16 may be controlled to adjust the gain applied to the baseband I signal part and/or to the baseband Q signal part.

As another example, if the at least one error comprises an IQ quadrature error, the baseband I signal part and/or the baseband Q signal part may be adapted by an appropriate filter, for example by a filter of the baseband circuit 14.

In an embodiment, the filter may determine an adapted baseband I signal part I', which corresponds to a linear combination of the baseband I signal part and the baseband Q signal part, i.e. $I'=a_1I+b_1Q$. Further, the filter may determine an adapted baseband Q signal part Q', which corresponds to a linear combination of the baseband I signal part and the baseband Q signal part, i.e. $Q'=a_2I+b_2Q$. Therein, the filter coefficients $a_i$, $b_i$ are determined such that the IQ quadrature error is compensated.

Alternatively or additionally, the phases of the LO signal applied to the baseband I signal part and/or to the baseband Q signal part by the mixer circuit 28 may be adapted such that the phase difference is exactly 90°.

The correction described above may be performed iteratively, such that the (absolute) value of the at least one error quantity decreases with each iteration. Alternatively, a single correction step may be applied.

For the steps of the method described above, it has been assumed that the summed frequency Fd is different from 0. However, the method can likewise be applied for the summed frequency Fd being equal to 0, i.e. for F1=−F2. The necessary modifications compared to the method described above are described hereinafter.

In step S1, the first tone is generated with frequency F1, and the second tone is generated with frequency F2=−F1. The other criteria described above, i.e. apart from Fd≠0, likewise apply.

In step S3, a level function describing a signal level of the modulated IQ signal over a relative phase of the first tone and the second tone is determined. For this purpose, the first tone and the second tone are consecutively generated with different relative phases, and a corresponding sample of the level function is determined for each relative phase. For example, the relative phase may be varied between 0 and 2π.

The at least one error quantity can then be determined based on the determined level function, and the at least one error corresponding to the at least one determined error quantity can be corrected.

In a specific example, the at least one error quantity can be determined as follows.

The first tone and the second tone are generated with a phase difference of φ(n), wherein the phase difference φ(n) is varied between N different values according to $\varphi(n)=2\pi(n-1)/N$ with n=1, . . . , N.

The first tone is proportional to $\exp(2\pi i\cdot F1\cdot t)$, while the second tone is proportional to $\exp(-i(2\pi\cdot F1\cdot t+\varphi(n)))$.

The IQ gain imbalance and the IQ quadrature error are then described by or proportional to the error quantities $E_{IQ,g}$ and $E_{IQ,quad}$, respectively, which are given by $$E_{IQ,g}=\sum_{n=1}^{N}A(n)\cos(\varphi(n))$$

$$E_{IQ,quad}=\sum_{n=1}^{N}A(n)\sin(\varphi(n)).$$

Therein, A(n) is the determined level function, wherein A(n) is used as an abbreviation for A(φ(n)).

Certain embodiments disclosed herein include systems, apparatus, modules, units, devices, components, etc., that utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a graphics processing unit (GPU), a digital signal processor (DSP), an application-specific integrated circuit (ASIC), a field programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

For example, the functionality described herein can be implemented by special purpose hardware-based computer systems or circuits, etc., or combinations of special purpose hardware and computer instructions. Each of these special purpose hardware-based computer systems or circuits, etc., or combinations of special purpose hardware circuits and computer instructions form specifically configured circuits, machines, apparatus, devices, etc., capable of implementing the functionality described herein.

Of course, in an embodiment, two or more of these components, or parts thereof, can be integrated or share hardware and/or software, circuitry, etc. In an embodiment, these components, or parts thereof, may be grouped in a single location or distributed over a wide area. In circumstances where the components are distributed, the components are accessible to each other via communication links.

In an embodiment, one or more of the components of the electronic device 10, etc., referenced above include circuitry programmed to carry out one or more steps of any of the methods disclosed herein. In an embodiment, one or more computer-readable media associated with or accessible by such circuitry contains computer readable instructions embodied thereon that, when executed by such circuitry, cause the component or circuitry to perform one or more steps of any of the methods disclosed herein.

In an embodiment, the computer readable instructions includes applications, programs, program modules, scripts, source code, program code, object code, byte code, compiled code, interpreted code, machine code, executable instructions, and/or the like (also referred to herein as executable instructions, instructions for execution, program code, computer program instructions, and/or similar terms used herein interchangeably).

In an embodiment, computer-readable media is any medium that stores computer readable instructions, or other information non-transitorily and is directly or indirectly accessible by a computing device, such as processor circuitry, etc., or other circuitry disclosed herein etc. In other words, a computer-readable medium is a non-transitory memory at which one or more computing devices can access instructions, codes, data, or other information. As a non-limiting example, a computer-readable medium may include a volatile random access memory (RAM), a persistent data store such as a hard disk drive or a solid-state drive, or a combination thereof. In an embodiment, memory can be integrated with a processor, separate from a processor, or external to a computing system.

Accordingly, blocks of the block diagrams and/or flowchart illustrations support various combinations for performing the specified functions, combinations of operations for performing the specified functions and program instructions for performing the specified functions. These computer program instructions may be loaded onto one or more computer or computing devices, such as special purpose computer(s) or computing device(s) or other programmable data processing apparatus(es) to produce a specifically-configured machine, such that the instructions which execute on one or more computer or computing devices or other programmable data processing apparatus implement the functions specified in the flowchart block or blocks and/or carry out the methods described herein. Again, it should also be understood that each block of the block diagrams and flowchart illustrations, and combinations of blocks in the block diagrams and/or flowchart illustrations, or portions thereof, could be implemented by special purpose hardware-based computer systems or circuits, etc., that perform the specified functions or operations, or combinations of special purpose hardware and computer instructions.

It will be appreciated that in one or more embodiments, the term computer or computing device can include, for example, any computing device or processing structure, including but not limited to a processor (e.g., a microprocessor), a central processing unit (CPU), a digital signal processor (DSP), an application-specific integrated circuit (ASIC), a field-programmable gate array (FPGA), a system on a chip (SoC), a graphics processing unit (GPU) or the like, or any combinations thereof.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure.

Although the method and various embodiments thereof have been described as performing sequential steps, the claimed subject matter is not intended to be so limited. As nonlimiting examples, the described steps need not be performed in the described sequence and/or not all steps are required to perform the method. Moreover, embodiments are contemplated in which various steps are performed in parallel, in series, and/or a combination thereof. As such, one of ordinary skill will appreciate that such examples are within the scope of the claimed embodiments.

In the detailed description herein, references to "one embodiment", "an embodiment", "an example embodiment", "one or more embodiments", "some embodiments", etc., indicate that the embodiment or embodiments described may include a particular feature, structure, or characteristic, but every embodiment may not necessarily include the particular feature, structure, or characteristic. Moreover, such phrases are not necessarily referring to the same embodiment or embodiments. In addition, when a particular feature, structure, or characteristic is described in connection with an embodiment or embodiments, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Thus, it will be appreciated that embodiments of the present disclosure may employ any combination of features described herein. All such combinations or sub-combinations of features are within the scope of the present disclosure.

Throughout this specification, terms of art may be used. These terms are to take on their ordinary meaning in the art from which they come, unless specifically defined herein or the context of their use would clearly suggest otherwise.

The drawings in the FIGURES are not to scale. Similar elements are generally denoted by similar references in the FIGURES. For the purposes of this disclosure, the same or similar elements may bear the same references. Furthermore, the presence of reference numbers or letters in the drawings cannot be considered limiting, even when such numbers or letters are indicated in the claims.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. While the stated range includes one or both of the limits, ranges excluding either or both of those included limits are also included in the disclosure The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A method of suppressing unwanted signal portions in an IQ signal generated by an IQ signal generator system, the IQ signal generator system comprising a baseband circuit, an IQ modulator circuit, an analysis circuit, and a control circuit, wherein the method comprises:

generating, by the baseband circuit, a baseband IQ signal having a baseband I signal part and a baseband Q signal part, wherein the baseband IQ signal is a multi-tone signal;

modulating, by the IQ modulator circuit, the baseband IQ signal, thereby obtaining a modulated IQ signal;

determining, by the analysis circuit, a level function describing a signal level of the modulated IQ signal over time and/or over a phase of the multi-tone signal;

determining, by the analysis circuit, at least one error quantity based on the level function, wherein the at least one error quantity is indicative of at least one error in the IQ signal generator system; and controlling, by the control circuit, the baseband circuit and/or the IQ modulator circuit in dependence of the at least one error quantity determined, thereby correcting the at least one error in the IQ signal generator system, wherein the multi-tone signal comprises a first frequency and a second frequency, wherein a summed frequency being a sum of the first frequency and the second frequency is different from zero, and wherein the level function multiplied with a spectral factor is integrated over time in order to determine the at least one error quantity.

2. The method according to claim 1, wherein the at least one error quantity is indicative of an IQ gain imbalance, and/or of an IQ quadrature error.

3. The method according to claim 1, wherein the level function is an envelope of the modulated IQ signal.

4. The method according to claim 1, wherein the analysis circuit comprises an envelope detector, and wherein the level function is determined by the envelope detector.

5. The method according to claim 1, wherein the individual signals of the multi-tone signal are distributed over sidebands of the modulated IQ signal.

6. The method of claim 1, wherein the spectral factor depends on the summed frequency.

7. The method of claim 1, wherein the level function multiplied with the spectral factor is integrated over a predetermined period or a multiple of the predetermined period, wherein the predetermined period is the inverse of the summed frequency.

8. The method of claim 7, wherein the spectral factor is integrated over an integer multiple of the predetermined period.

9. The method according to claim 1, wherein the at least one error quantity is determined for a set of first frequencies and second frequencies, respectively.

10. The method according to claim 1, wherein the individual tones of the baseband IQ signal are generated by different signal generator units.

11. The method according to claim 1, wherein a gain applied to the baseband I signal part and/or a gain applied to the baseband Q signal part are/is adjusted in order to correct the at least one error.

12. The method according to claim 1, wherein an adapted baseband I signal part is determined, wherein the adapted baseband I signal part is a linear combination of the baseband I signal part and the baseband Q signal part.

13. The method of claim 1, wherein an adapted baseband Q signal part is determined, wherein the adapted baseband Q signal part is a linear combination of the baseband I signal part and the baseband Q signal part.

14. The method according to claim 1, wherein a phase difference between a local oscillator signal being applied to the I signal part and the local oscillator signal being applied to the Q signal part is adapted in order to correct the at least one error.

15. An IQ signal generator system, comprising: a baseband circuit, an IQ modulator circuit, an analysis circuit, and a control circuit, wherein the IQ signal generator system is configured to perform the method according to claim 1.

16. A method of suppressing unwanted signal portions in an IQ signal generated by an IQ signal generator system, the IQ signal generator system comprising a baseband circuit, an IQ modulator circuit, an analysis circuit, and a control circuit, wherein the method comprises:

generating, by the baseband circuit, a baseband IQ signal having a baseband I signal part and a baseband Q signal part, wherein the baseband IQ signal is a multi-tone signal;

modulating, by the IQ modulator circuit, the baseband IQ signal, thereby obtaining a modulated IQ signal;

determining, by the analysis circuit, a level function describing a signal level of the modulated IQ signal over time and/or over a phase of the multi-tone signal;

determining, by the analysis circuit, at least one error quantity based on the level function, wherein the at least one error quantity is indicative of at least one error in the IQ signal generator system; and controlling, by the control circuit, the baseband circuit and/or the IQ modulator circuit in dependence of the at least one error quantity determined, thereby correcting the at least one error in the IQ signal generator system, wherein the multi-tone signal comprises a first frequency and a second frequency, wherein a summed frequency being a sum of the first frequency and the second frequency is equal to zero, and wherein the level function is determined by varying a phase between the individual tones of the baseband IQ signal.

* * * * *